United States Patent [19]

Chalaire et al.

[11] Patent Number: 4,782,919

[45] Date of Patent: Nov. 8, 1988

[54] SUPPLY SYSTEM FOR OIL DAMPERS

[75] Inventors: Donald K. Chalaire, Jupiter; John A. Muller; Halfen L. Hoyt, both of Stuart, all of Fla.

[73] Assignee: United Technologies Corporation, Hartford, Conn.

[21] Appl. No.: 135,767

[22] Filed: Dec. 21, 1987

[51] Int. Cl.$^4$ .................. F16C 27/00; F16C 39/04
[52] U.S. Cl. ................... 184/6.11; 188/266; 248/636; 384/99
[58] Field of Search ............ 384/99, 535; 184/6.11, 184/6.16; 137/512.3, 512; 74/574; 188/266, 297; 248/562, 636, 638

[56] References Cited

U.S. PATENT DOCUMENTS

| | | | |
|---|---|---|---|
| 2,729,518 | 1/1956 | O'Connor | 384/99 |
| 3,610,712 | 10/1971 | Endress | 384/287 |
| 4,213,661 | 7/1980 | Marmol | 384/99 |
| 4,655,248 | 4/1987 | Chalaire | 137/528 |
| 4,669,893 | 6/1987 | Chalaire et al. | 384/99 |

Primary Examiner—Leonard E. Smith
Attorney, Agent, or Firm—Norman Friedland

[57] ABSTRACT

The oil supply system for a fluid squeeze film damper carries a high frequency check valve mounted in serial flow relation to a low frequency check valve, wherein the low frequency check valve is disposed between the source of oil and the high frequency check valve so as to maintain the stiffness of the oil film and high level of the average oil pressure.

4 Claims, 2 Drawing Sheets

SUPPLY SYSTEM FOR OIL DAMPERS

This invention was made under a Government contract and the Government has rights herein.

DESCRIPTION

1. Technical Field

This invention relates to fluid dampers for damping cyclical, transverse orbital movement of a nonrotating cylindrical body occasioned by the rotating shaft carrying the compressors and turbines of a gas turbine engine and particularly to means for reducing starvation and/or cavitation in the oil supply system.

2. Background Art

This invention constitutes an improvement over the fluid damping system and particularly the oil supply system of the system disclosed and claimed in U.S. Pat. No. 4,669,893 entitled "Annular Oil Damper Arrangement" granted on June 2, 1987 to Donald Chalaire, Halfen L. Hoyt and James Hurchalla, and U.S. Pat. No. 4,655,248 entitled "Check Valve" granted on Apr. 7, 1987 to Donald K. Chalaire, both patents being assigned to United Technologies Corporation, the assignee of this patent application.

U.S. Pat. No. 4,669,893 supra, discloses and claims a fluid supply system for a fluid damper for a bearing supporting shaft of a gas turbine engine intended to control the transverse orbital movement of a nonrotating cylinder induced by the vibratory energy created by the rotating shaft as occasioned by out-of-roundness. The oil supply system consists of a reservoir completely filled with fluid used by the damper and a predetermined sized vent communicating with the reservoir to allow a predetermined amount of leakage. Oil is continuously supplied to the damper by a hydraulic pump. A sized orifice disposed between the fluid damper and the reservoir controls the volumetric flow rate of the damping fluid, maintains an elevated average static fluid pressure in the annular volume of the fluid damper and resists surge flow into the reservoir during periodic occurrence of high fluid pressure in the fluid damper.

U.S. Pat. No. 4,655,248 supra, discloses and claims a high frequency check valve of the type employed in the oil supply system of the fluid damper described in the U.S. Pat. No. 4,669,893 referred to in the immediate above. The high frequency check valve disposed on the annulus inlet hole closes against the high pressure wave precluding back-pumping and opens upon the following suction and operates in a high frequency environment where commercially available check valves have proven to be unsatisfactory.

As will be appreciated the oil supply system described in U.S. Pat. No. 4,669,893 supra, incorporating the high frequency check valve described in U.S. Pat. No. 4,655,248 supra, discloses a typical oil supply system with a flow controlled exit to the scavenge line that is in direct communication with a typical scavenged pump. When the rotating annulus high pressure wave comes past the inlet hole, the higher local pressure causes flow up the supply line. When the following low pressure suction comes past the exit hole, air is drawn in. The consequence of these occurrences causes aeration, resulting in a softening of the oil film of the annular fluid damper thereby reducing its damping effectiveness. The degree of starvation is related to the amplitude of vibration the damper is requested to reduce as dictated by the exigencies of the rotating shaft.

DISCLOSURE OF THE INVENTION

The present invention will to some extent reduce or eliminate starvation and/or cavitation in these types of oil film dampers, sometimes referred to as squeeze film dampers, so that more vibration attenuation can be done without a corresponding increase in the supply pressure or the size and weight of the damper itself. All of these features are of significant interest as they have a direct relationship to the weight of a gas turbine engine which is, in turn, directly related to overall engine performance.

We have found that by placing a check valve (low frequency type) in serial flow relationship with the high frequency check valve and positioned between the oil supply pump and high frequency check valve, we can prevent high frequency back pumping of oil out of the damper which keeps the oil film stiff and the average oil pressure high. From actual test data, we have found that the three components, namely the sized orifice, the high frequency check valve, and the low frequency check valve, when properly sized, work together to form a system which provides significantly improved damper performance for large amplitude dampers. In fact, we have evidenced a synergistic effect, where the components tested as a system, gave a higher performance than one would expect after testing the individual components.

Accordingly, a feature of this invention is to provide an improved oil film damper.

A further feature of this invention is to provide an improved oil film damper by incorporating a conventional check valve disposed upstream of and in serial flow relation to the high frequency check valve in the damper's oil supply system.

The foregoing and other features and advantages of the present invention will become more apparent from the following description and accompanying drawings.

BEST MODE FOR CARRYING OUT THE INVENTION

Figure 1:
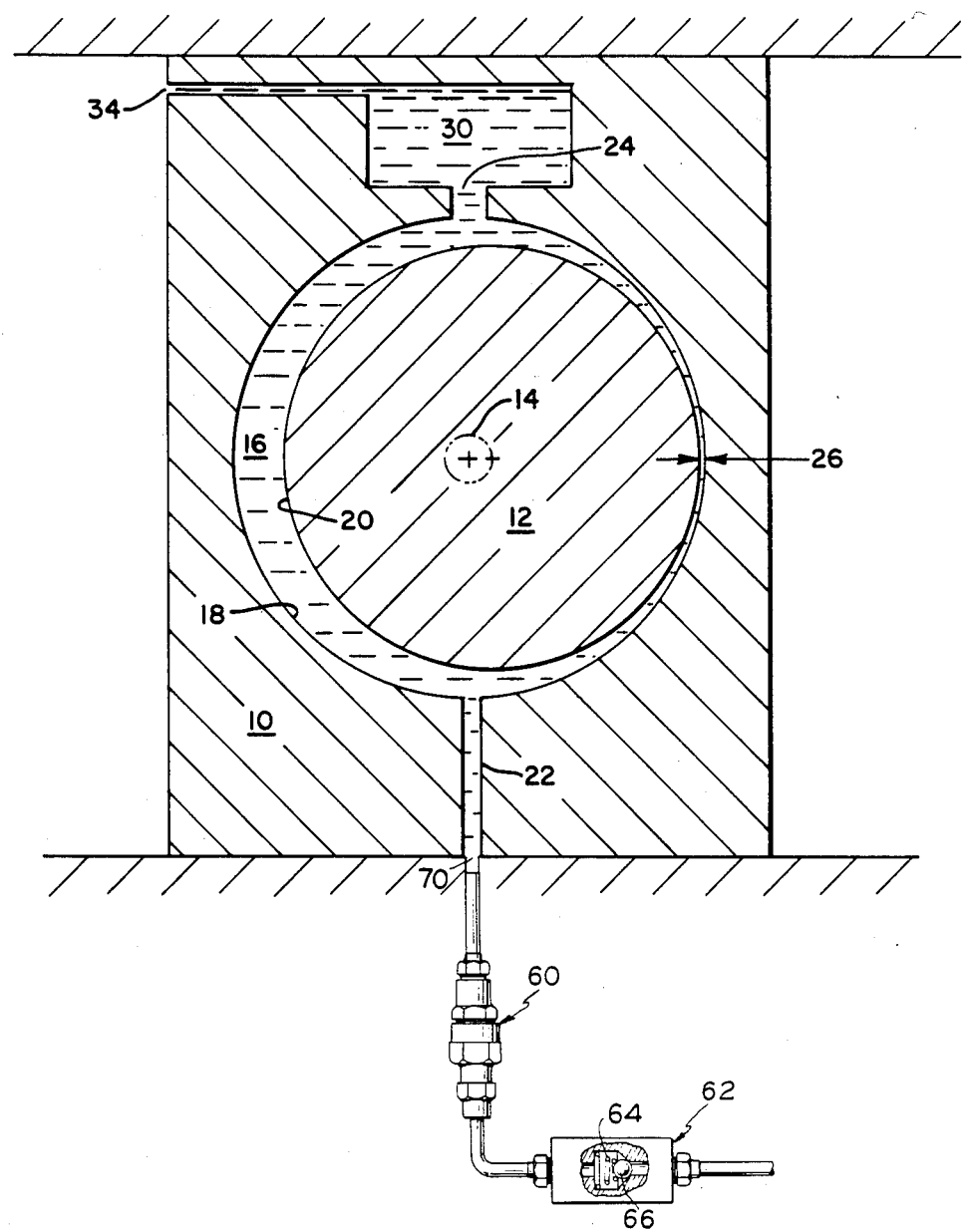
FIG. 1 shows a cross sectional view normal to the axis of rotation of an annular damper and a schematic of the oil supply system according to the present invention.

Reference is made to FIG. 1 which shows a portion of a typical fluid damper comprising support housing 10 disposed about a cylindrical internal member 12 which is subject to attempted cyclical orbital motion 14. Cylindrical member 12 is the nonrotating bearing sleeve, hereinafter referred to as the sleeve 12. A flow of damping fluid is introduced into the annular volume 16 formed between the inner surface 18 of the support member 10 and the outer surface 20 of the sleeve 12 via supply conduit 22.

The fluid fills the annular volume 16, eventually exiting through a vent opening 24 also disposed in the support 10. During operation, the damper thus described absorbs the momentum of the sleeve 12 through viscous and hydrodynamically created forces resulting from the presence of the damping fluid in the annulus 16.

As is well known, the orbital motion 14 of the sleeve 12 causes a circumferential pressure wave to be propagated around the support member surface 18 in advance of the orbiting line of closest approach 26 between the sleeve 12 and the support 10. The local fluid pressure reaches a maximum at the line of closest approach 26, thereby exerting a substantial radial opposing force on the sleeve 12 and preventing undesirable contact between the sleeve 12 and support surfaces 20, 18. A local region of relatively low pressure also trails the sleeve 12, with the resulting radial and tangential pressure imbalances, in addition to the viscosity of the damping fluid within the annulus, acting to damp the magnitude of the orbital motion 14 of the sleeve 12, translating the absorbed tangential momentum into heat energy within the damping fluid. The continuous renewal of the fluid within the annulus 16 from supply conduit 22 is essential to the continued operation of such dampers.

The vent 24 opens into a low pressure scavenge area or the like wherein the vented damping fluid is collected for subsequent cooling, other usage, or recycle. Such low pressure venting, which is extremely simple to implement, reduces the local fluid pressure within the annulus 16 as the rotating pressure zone passes adjacent to the vent opening 24.

As we described in U.S. Pat. No. 4,669,893 supra, fluid pressure is maintained within the annulus 16 and the reservoir 30 by providing a sized orifice 34 in the reservoir 30 for restricting the flow of hydraulic fluid therefrom. Orifice 34 is sized not only to regulate the volume flow of damping fluid through the damper, but also to maintain the fluid pressure within the reservoir 30 volume 30 and annulus 16 as high as practicable to prevent separation of dissolved air in the moving low pressure zone. For typical aircraft gas turbine engines having a lubricating oil supply average pressure of 30–200 pounds per square inch (207–1,380 kPa), the dynamic operating pressures of the reservoir volume 30 and annulus 16 can be in the range of 500 to 2,000 pounds per square inch (3,450 to 13,800 kPa).

In operation the leading high pressure wave passes the vent opening 24, the zone of high pressure attempts to drive the damping fluid through the vent 24 into the reservoir 30. Reservoir 30, being completely filled with the relatively incompressible damping fluid, experiences a nearly instantaneous increase in fluid pressure as a result. The increased fluid pressure in the reservoir volume 30 has a limited effect on the volumetric rate of fluid flow through the exit orifice 34 as discussed above, preventing the reservoir from quickly relieving the high pressure pulse through increased exit fluid flow. The cooperative effort of the solid fluid reservoir 30, fixed orifice 34 and vent 24 thus opposes significant increased flow of damping fluid from the annulus 16 through the vent 24 during the passage of the high pressure zone past the vent opening 24.

Upon passage of the line of closest approach 26 past the vent 24, the pressure in the reservoir is reduced by fluid communication with the trailing low pressure zone in the annulus 16. Although the movement of fluid from the reservoir 30 into the annulus 16 via the vent 24 during this period is very small, the effect is still sufficient to maintain sufficient absolute static pressure of the damping fluid in this area, reducing the likelihood of the occurrence of separation between the dissolved gases and the fluid.

In a typical gas turbine engine operating environment, the damping fluid exiting the reservoir 30 through the orifice 34 runs into a collecting sump (not shown) whence it is recycled to the supply conduit 22 by a circulating pump (not shown) or the like. Such systems are nearly universal in the gas turbine engine industry wherein it is additionally desirable to avoid a high circulation rate of the damping fluid (lubricating oil). Such systems may be further augmented by the inclusion of coolers (not shown) or other fluid conditioners.

As was discussed in U.S. Pat. No. 4,669,893 supra, prior art oil supply systems utilize a check valve for rendering the flow of fluid in the conduit 22 substantially unidirectional to prevent the occurrence of temporary reverse flow in the conduit 22 under the influence of the circumferential pressure wave.

A suitable check valve generally indicated by reference numeral 60 is the check valve disclosed in U.S. Pat. No. 4,655,248 supra. This type of check valve operates in environments where the flow reversal exceeds 80 Hz and as already discussed in the prior art the gas turbine engine environment requires that the check valve be capable of operating when the flow reversal exceeds 130 Hz. Notwithstanding the use of a high frequency check valve and while an improvement over prior art systems was evidenced, aeration has still been evidenced.

According to this invention the starvation and/or cavitation is significantly, if not totally, reduced by incorporating a conventional check valve in combination with the high frequency check valve 60. The conventional check valve 62 can be any commercially available check valve that operates in a frequency range well below the 80 Hz. As seen in FIG. 1, check valve 62 is comprised of a loading spring 64 and a ball 66.

The high frequency exit reservoir becomes pressurized with the rotating pressure wave and subsequently delivers this oil back to the annulus 16 during passing of the following suction. The high frequency check valve 60 on the annulus inlet hole 70 closes against the high pressure wave precluding back pumping and opens upon the following suction. This admits oil on a per cycle basis. The conventional check valve 62 further upstream works with the high frequency check valve 60 and disturbs the phasing of its leakage. This causes the efficiency of the high frequency checking to be increased from an estimated 80% to 90%. The dimensions, details and locations of these three components, i.e. the high frequency exit reservoir 30, the high frequency check valve 60 and check valve 62, significantly improved damper performance for large amplitude dampers.

Figure 2:
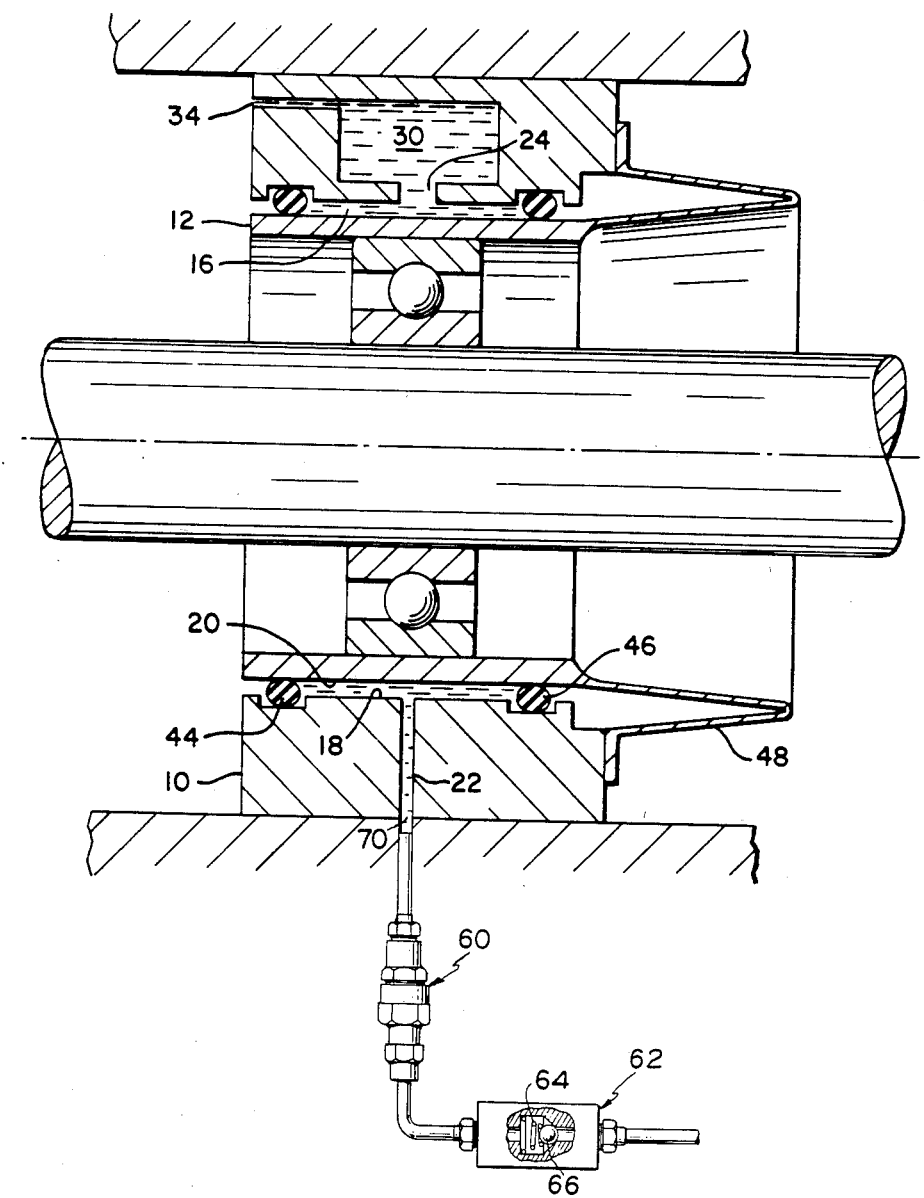
FIG. 2 shows a longitudinal cross sectional view of the damper and a similar schematic as that illustrated in FIG. 1 according to the present invention.

FIG. 2 shows a sectional view of the damper of the present invention taken in the plane of the central shaft axis. The annular volume 16 is shown between the cylinder surface 20 and the inner surface 18 of the support member 10. Longitudinal flow of damping fluid from the volume 16 is prevented by longitudinal seals such as elastomeric O-rings 44, 46. Also shown is an annular spring flange 48 secured between the sleeve 12 and the support member 10 for holding the sleeve 12 against longitudinal displacement while allowing relatively free radial movement.

The annular volume 16 is thus defined by a fluid-tight, inflexible structure. The only fluid flow paths to or from the volume 16 are as defined by the vent opening 24 and the supply conduit 22.

Although this invention has been shown and described with respect to detailed embodiments thereof, it will be understood by those skilled in the art that various changes in form and detail thereof may be made without departing from the spirit and scope of the claimed invention.

We claim:

1. An oil supply system for maintaining the stiffness and high pressure of the oil film of an annular oil film damper for dampening the high energy vibrations occasioned by a rotating shaft comprising a nonrotating cylindrical sleeve disposed within a surrounding support member;

a fluid-tight annular volume defined between the outer surface of said nonrotating cylindrical sleeve and the inner surface of said surrounding support member;

means, including a fluid supply line, for conducting fluid from a pressurized source to said fluid-tight volume;

a first check valve having a high frequency response characteristic disposed in said fluid supply line; and a second check valve having a relatively low frequency response characteristic relative to the frequency responsiveness of said first check valve also disposed in said fluid supply line.

2. An oil supply system as in claim 1 wherein said second check valve is disposed upstream of said first check valve relative to the flow of the oil from the pressurized source.

3. An oil supply system as in claim 1 including means for venting the fluid-tight annular volume.

4. An oil supply system as in claim 3 including an enclosed reservoir, defining an internal volume of fixed magnitude and in fluid communication with the venting means, for receiving and holding an equivalent volume of dampening fluid therein, and a fixed orifice for leading fluid into said reservoir.

* * * * *